US012767269B2

(12) United States Patent
Lampman

(10) Patent No.: US 12,767,269 B2
(45) Date of Patent: Oct. 20, 2026

(54) VALVE-CONTROLLED FLUID CIRCUITS

(71) Applicant: Fox Factory, Inc., Duluth, GA (US)

(72) Inventor: Brian Lampman, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 447 days.

(21) Appl. No.: 18/388,409

(22) Filed: Nov. 9, 2023

(65) Prior Publication Data

US 2025/0153801 A1 May 15, 2025

(51) Int. Cl.
*B62M 6/40* (2010.01)

(52) U.S. Cl.
CPC .................................... *B62M 6/40* (2013.01)

(58) Field of Classification Search
CPC .......... B62M 6/40; B60G 17/04; B60G 17/06; B60G 17/005; B62K 25/08; F16F 9/44; F16F 9/56
See application file for complete search history.

(56) References Cited

U.S. PATENT DOCUMENTS

| | | | |
|---|---|---|---|
| 6,036,212 | A | 3/2000 | Baldomero |
| 6,296,092 | B1 | 10/2001 | Marking et al. |
| 7,374,028 | B2 | 5/2008 | Fox |
| 8,838,335 | B2 | 9/2014 | Bass et al. |
| 9,033,122 | B2 | 5/2015 | Ericksen et al. |
| 9,120,362 | B2 | 9/2015 | Marking |
| 9,239,090 | B2 | 1/2016 | Marking et al. |
| 9,353,818 | B2 | 5/2016 | Marking |
| 9,623,716 | B2 | 4/2017 | Cox |
| 9,682,604 | B2 | 6/2017 | Cox et al. |
| 9,797,467 | B2 | 10/2017 | Wootten et al. |
| 10,036,443 | B2 | 7/2018 | Galasso et al. |
| 10,415,662 | B2 | 9/2019 | Marking |
| 10,427,742 | B2 | 10/2019 | Osada et al. |
| 10,576,803 | B2 | 3/2020 | Marking et al. |
| 10,933,710 | B2 | 3/2021 | Tong |
| 11,091,215 | B2 | 8/2021 | Madau et al. |

(Continued)

FOREIGN PATENT DOCUMENTS

| | | | |
|---|---|---|---|
| DE | 102024132710 | A1 | 5/2025 |
| EP | 4407208 | A1 | 7/2024 |

(Continued)

OTHER PUBLICATIONS

European Patent No. EP 4407208 to Ericksen published on Jul. 31, 2024.*

(Continued)

*Primary Examiner* — Pamela Rodriguez

(57) ABSTRACT

A valve assembly configured to control a first fluid circuit and a second fluid circuit. The valve assembly has a second fluid circuit valve assembly which includes a second fluid circuit valve adjustor configured to actuate an adjustor shaft and an adjustor circuit coupled with the adjustor shaft. An input to the second fluid circuit valve adjustor translates into a movement of the adjustor shaft. The adjustor circuit also includes a second fluid circuit valve and a secondary first fluid circuit valve which is located in a first fluid circuit flow path of a first fluid circuit valve. The secondary first fluid circuit valve adjusts flow through the first fluid circuit flow path when the second fluid circuit valve adjustor is in a closed position.

21 Claims, 15 Drawing Sheets

(56) References Cited

U.S. PATENT DOCUMENTS

| | | | |
|---|---|---|---|
| 11,629,771 B2 | 4/2023 | Gilbert et al. | |
| 2003/0001358 A1* | 1/2003 | Becker | F16F 9/56 188/282.1 |
| 2011/0083930 A1* | 4/2011 | Laird | F16F 13/002 188/314 |
| 2019/0219122 A1 | 7/2019 | Galasso et al. | |
| 2020/0180727 A1* | 6/2020 | Pye | F16F 9/49 |
| 2021/0214041 A1* | 7/2021 | Sullivan | B62K 25/08 |
| 2022/0403909 A1* | 12/2022 | Laird | F16F 9/44 |

FOREIGN PATENT DOCUMENTS

| | | |
|---|---|---|
| GB | 2639080 A | 9/2025 |
| TW | 202538187 A | 10/2025 |

OTHER PUBLICATIONS

First Office Action for Taiwan Application No. 113141992, 3 Pages, Mailed Aug. 22, 2025.

United Kingdom Search Report for UK Application No. GB2416474.1, 1 page, Mailed May 12, 2025.

* cited by examiner

VALVE-CONTROLLED FLUID CIRCUITS

FIELD OF THE INVENTION

Embodiments of the invention generally relate to adjustable shock assemblies.

BACKGROUND OF THE INVENTION

Shock assemblies (e.g., dampers, shock absorbers, etc.) are used in numerous different vehicles and configurations to absorb some or all of a movement that is received at an unsprung portion of a vehicle before it is transmitted to a suspended portion of the vehicle. For example, when a wheel hits a pothole, the encounter will cause an impact force on the wheel. However, by utilizing suspension components including one or more shock assemblies, the impact force can be significantly reduced or even absorbed completely before it is transmitted to a person on a seat of the vehicle. However, depending upon the terrain being traversed, it can be valuable to be able to change the amount of shock absorption provided by the shock assembly for personal comfort, vehicle performance, and the like.

Figure 1:
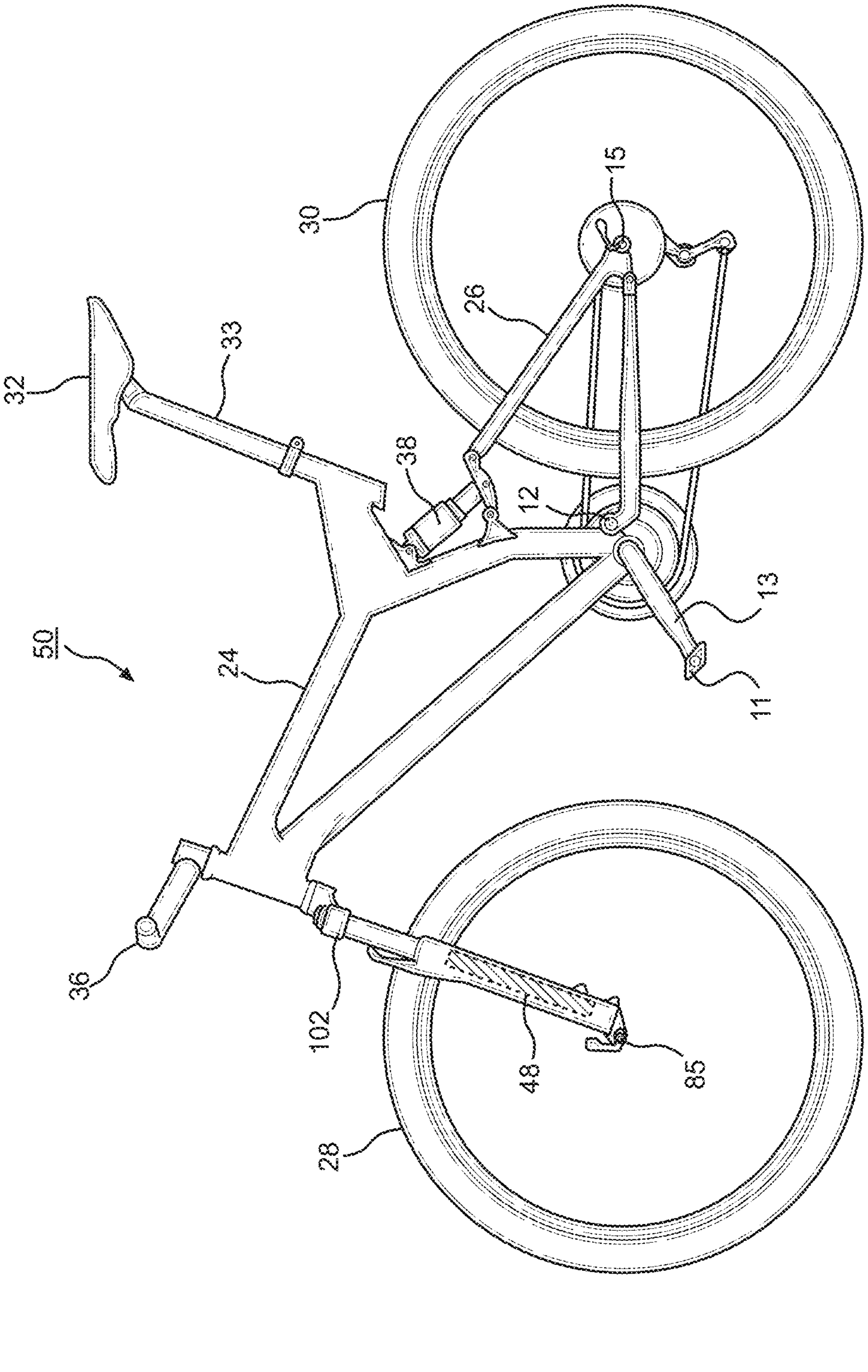
FIG. 1 is a perspective view of a bicycle with at least one shock assembly utilizing a first fluid circuit valve coupled to second fluid circuit, in accordance with one embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

The adjustable shock assembly often consists of a (damping) piston and piston rod telescopically mounted in a fluid filled cylinder (e.g., a housing). The fluid (e.g., damping fluid, working fluid, etc.) may be, for example, a hydraulic oil, a gas such as nitrogen, air, or the like. In one embodiment, the adjustable shock assembly will include a mechanical spring (e.g., a helically wound spring that surrounds or is mounted in parallel with the body of the adjustable shock assembly). In one embodiment, the adjustable shock assembly will include an air spring. In one embodiment, the adjustable shock assembly will include both a mechanical spring and an air spring.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

As used herein, the terms “down”, “up”, “downward”, “upward”, “lower”, “upper”, and other directional references are relative and are used for reference and identification purposes.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In the following discussion, the term “active”, as used when referring to a valve or shock assembly component, means adjustable, manipulatable, etc., during typical operation of the valve. For example, an active valve can have its operation changed to thereby alter a corresponding shock assembly characteristic damping from a “soft” setting to a “firm” setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used.

Similarly, it will be understood that in some embodiments, an active valve may be configured to automatically adjust its operation, and corresponding shock assembly damping characteristics, based upon received user input settings (e.g., a user-selected “comfort” setting, a user-selected “sport” setting, and the like). In many instances, an “active” valve is adjusted or manipulated electronically (e.g., using a powered solenoid, or the like) to alter the operation or characteristics of a valve and/or other component. As a result, in the field of suspension components and valves, the terms “active”, “electronic”, “electronically controlled”, and the like, are often used interchangeably.

In the following discussion, the term “manual” as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a “soft” setting to a “firm” setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after “typical operation of the vehicle”.

It should further be understood that a vehicle suspension may also be referred to using one or more of the terms “passive”, “active”, “semi-active” or “adaptive”. As is typically used in the suspension art, the term “active suspension” refers to a vehicle suspension which controls the vertical movement of the wheels relative to vehicle. Moreover, “active suspensions” are conventionally defined as either a “pure active suspension” or a “semi-active suspension” (a “semi-active suspension” is also sometimes referred to as an “adaptive suspension”). In a conventional “pure active suspension”, a motive source such as, for example, an actuator, is used to move (e.g. raise or lower) a wheel with respect to the vehicle. In a “semi-active suspension”, no motive force/actuator is employed to adjust move (e.g. raise or lower) a wheel with respect to the vehicle.

Rather, in a “semi-active suspension”, the characteristics of the suspension (e.g. the firmness of the suspension) are altered during typical use to accommodate conditions of the terrain and/or the vehicle. Additionally, the term “passive suspension”, refers to a vehicle suspension in which the characteristics of the suspension are not changeable during typical use, and no motive force/actuator is employed to adjust move (e.g. raise or lower) a wheel with respect to the vehicle. As such, it will be understood that an “active valve”, as defined above, is well suited for use in a “pure active suspension” or a “semi-active suspension”.

Embodiments provided herein disclose a new and novel secondary first fluid circuit shutoff valve coupled to a second fluid circuit adjuster that closes (or adjusts the flow of fluid in) the first fluid circuit when in the firm position. The secondary first fluid circuit valve is coupled to the second fluid circuit adjuster and allows the second fluid circuit adjuster to shut down fluid flow in the first fluid circuit in the firm position producing firm low, mid & high-speed compression damping while retaining a trail tuned valve stack. In one embodiment, the second fluid circuit adjuster does not significantly change first fluid circuit flow when in the open position or across the adjustment range of the second fluid circuit adjuster. In one embodiment, the second fluid circuit adjuster can be tuned to change the first fluid circuit flow characteristics based on second fluid circuit adjuster position for some or all of the adjustment range of the second fluid circuit adjuster.

In some embodiments, the first fluid circuit is a fluid circuit referred to, in the suspension art, as a low-speed circuit. Additionally, in some embodiments, the second fluid circuit is a fluid circuit referred to, in the suspension art, as a high-speed circuit. Further, in embodiments of the present invention, the first fluid circuit, the first fluid circuit valve and adjuster, the second fluid circuit, and the second fluid circuit valve and adjuster are used to adjust fluid flow during a compression event of a suspension. Additionally, in embodiments of the present invention, the first fluid circuit, the first fluid circuit valve and adjuster, the second fluid circuit, and the second fluid circuit valve and adjuster are used to adjust fluid flow during a rebound event of a suspension.

Referring now to FIG. 1, a schematic side view of a bicycle 50 having a shock assembly 48 with a first fluid circuit valve coupled to a second fluid circuit (e.g., a compression circuit) incorporated therewith is shown in accordance with one embodiment. Although a bicycle is used in the discussion. In one embodiment, the shock assembly with a first fluid circuit valve coupled to the second fluid circuit is used on another vehicle such as, but not limited to a road bike, a mountain bike, a gravel bike, an electric bike (e-bike), a hybrid bike, a scooter, a motorcycle, an ATV, a personal water craft (PWC), an aircraft, a single wheeled vehicle, a four-wheeled vehicle, a multi-wheeled vehicle, a snow mobile, a UTV such as a side-by-side, and the like. In one embodiment, the shock assembly with a first fluid circuit valve coupled to a second fluid circuit is used on a suspension inclusive device such as, but not limited to an exoskeleton, a seat frame, a prosthetic, an orthotic, a suspended floor, and the like.

Thus, between the disclosed examples as provided in view of a bicycle 50, the disclosed embodiments can be used on adjustable shock assemblies used by vehicles with wheels, skis, tracks, hulls, and the like and/or with suspension inclusive devices such as prosthetic limbs, orthotics, exoskeletons, etc.

In one embodiment, bicycle 50 has a main frame 24 with a suspension system comprising a swing arm 26 that, in use, is able to move relative to the rest of main frame 24; this movement is permitted by, inter alia, shock assembly 38. The front fork assembly 102 also provide a suspension function via a shock assembly 48 in at least one fork leg; as such the bicycle 50 is a full suspension bicycle (such as an ATB or mountain bike).

However, the embodiments described herein are not limited to use on full suspension bicycles. In particular, the term "suspension system" is intended to include vehicles having front suspension only, rear suspension only, seat suspension only, a combination of two or more different suspension types, and the like.

In one embodiment, swing arm 26 is pivotally attached to the frame 24 at pivot point 12. Although pivot point 12 is shown in a specific location, it should be appreciated that pivot point 12 can be found at a different location. In a hard tail bicycle embodiment, there would be no pivot point 12. In one embodiment of a hardtail bicycle, main frame 24 and swing arm 26 would be formed as a fixed frame.

Bicycle 50 includes a front wheel 28 which is coupled with the front fork assembly 102 via front axle 85. In one embodiment, a portion of front fork assembly 102 (e.g., a steerer tube) passes through the bicycle main frame 24 and couples with handlebars 36. In so doing, the front fork assembly and handlebars are rotationally coupled with the main frame 24 thereby allowing the rider to steer the bicycle 50.

Bicycle 50 includes a rear wheel 30 which is coupled to the swing arm 26 at rear axle 15, and a rear damping assembly (e.g., shock assembly 38) is positioned between the swing arm 26 and the frame 24 to provide resistance to the pivoting motion of the swing arm 26 about pivot point 12. In one embodiment, pedals 11 are coupled with crank arm 13. In one embodiment, saddle 32 is connected to the main frame 24 via a seatpost 33. In one embodiment, seatpost 33 is a dropper seatpost. In one embodiment, one or more of shock assembly 48, shock assembly 38, seatpost 33, handlebars 36, and/or the like include one or more active damping components.

In one embodiment, bicycle 50 includes an active suspension system including a controller, one or more sensors, smart components, active valve dampers, power source(s), and the like. Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

In one embodiment, the weight of the rider is supported by different aspects of the bicycle 50 during different ride conditions and/or riding effort. For example, when riding while sitting on the saddle 32 and pedaling, most of the rider weight is supported by the saddle 32, seatpost 33, and frame 24. With some rider weight being applied to the handlebars 36 and the input force being provided on the pedals 11. In contrast, when the rider is out of the saddle 32 (e.g., sprinting, going uphill and/or downhill, etc.) while there is still some weight on handlebar 36, the majority of the rider's weight will now be on the pedals 11.

Figure 2:
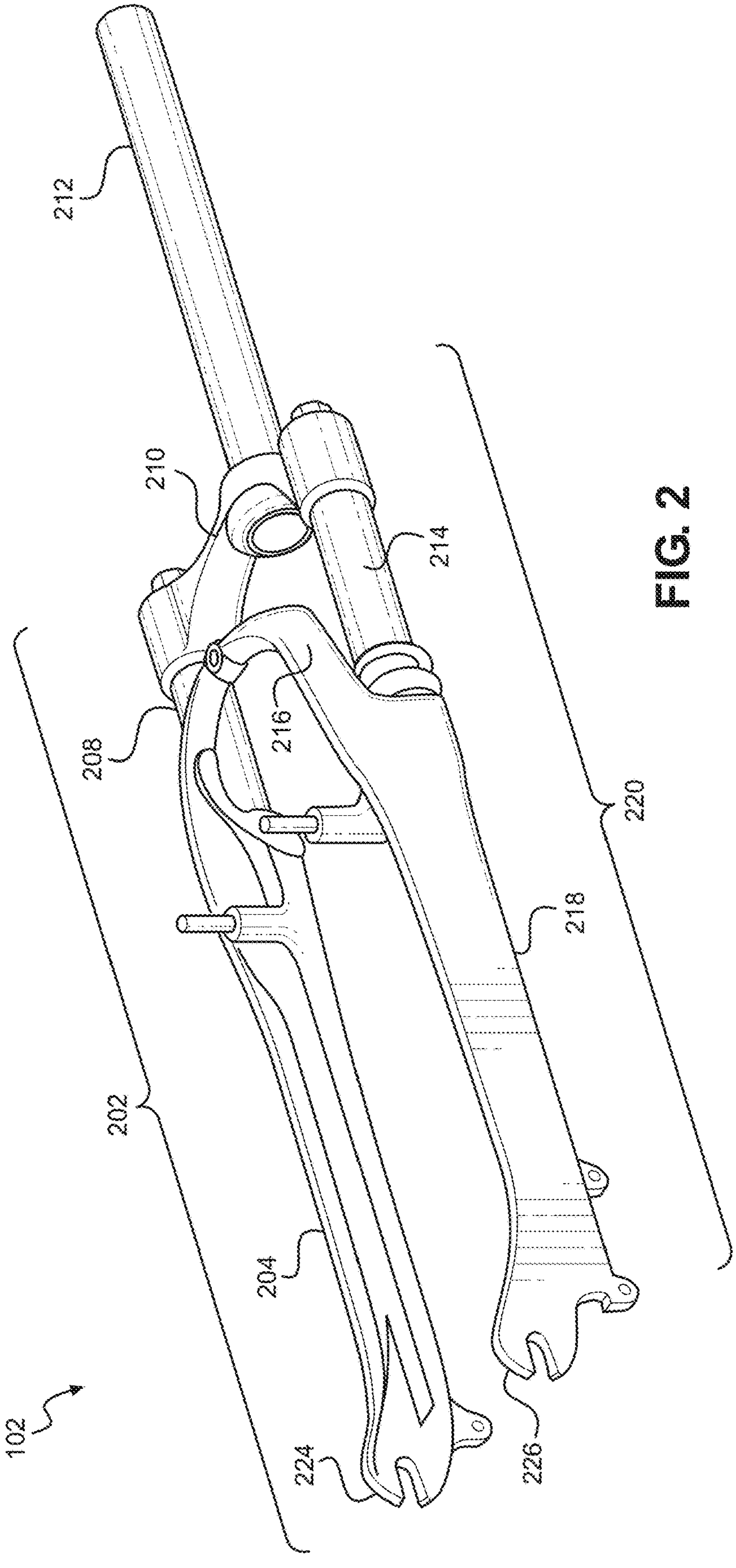
FIG. 2 is a perspective view of a front fork assembly having a shock assembly with a first fluid circuit valve coupled to a second fluid circuit, in accordance with one embodiment.

Referring now to FIG. 2, a perspective view of the front fork assembly 102, including a shock assembly with a first fluid circuit valve fluidically coupled to a second fluid circuit, is depicted as detached from the bicycle 50 of FIG. 1. The front fork assembly 102 includes right and left legs, 202 and 220, respectively, as referenced by a person in a riding position on the bicycle 50. The right leg 202 includes a right upper tube 208 telescopingly received in a right lower tube 204. Similarly, the left leg 220 includes a left upper tube 214 telescopingly received in a left lower tube 218.

In one embodiment, the telescoping of the legs is inverted. That is, the right lower tube 204 of right leg 202 is telescopingly received in the right upper tube 208. Similarly, the left lower tube 218 of left leg 220 is telescopingly received in the left upper tube 214.

A crown 210 connects the right upper tube 208 to the left upper tube 214 thereby connecting the right leg 202 to the left leg 220 of the front fork assembly 102. In addition, the crown 210 supports a steerer tube 212, which passes through, and is rotatably supported by, the frame 24 of the bicycle 50. The steerer tube 212 provides a means for connection of the handlebar assembly 36 to the front fork assembly 102.

Each of the right lower tube 204 and the left lower tube 218 includes dropouts 224 and 226, respectively, for connecting the front wheel 28 to the front fork assembly 102 via a front axle 85. An arch 216 connects the right lower tube 204 and the left lower tube 218 to provide strength and minimize twisting thereof.

Figure 3A:
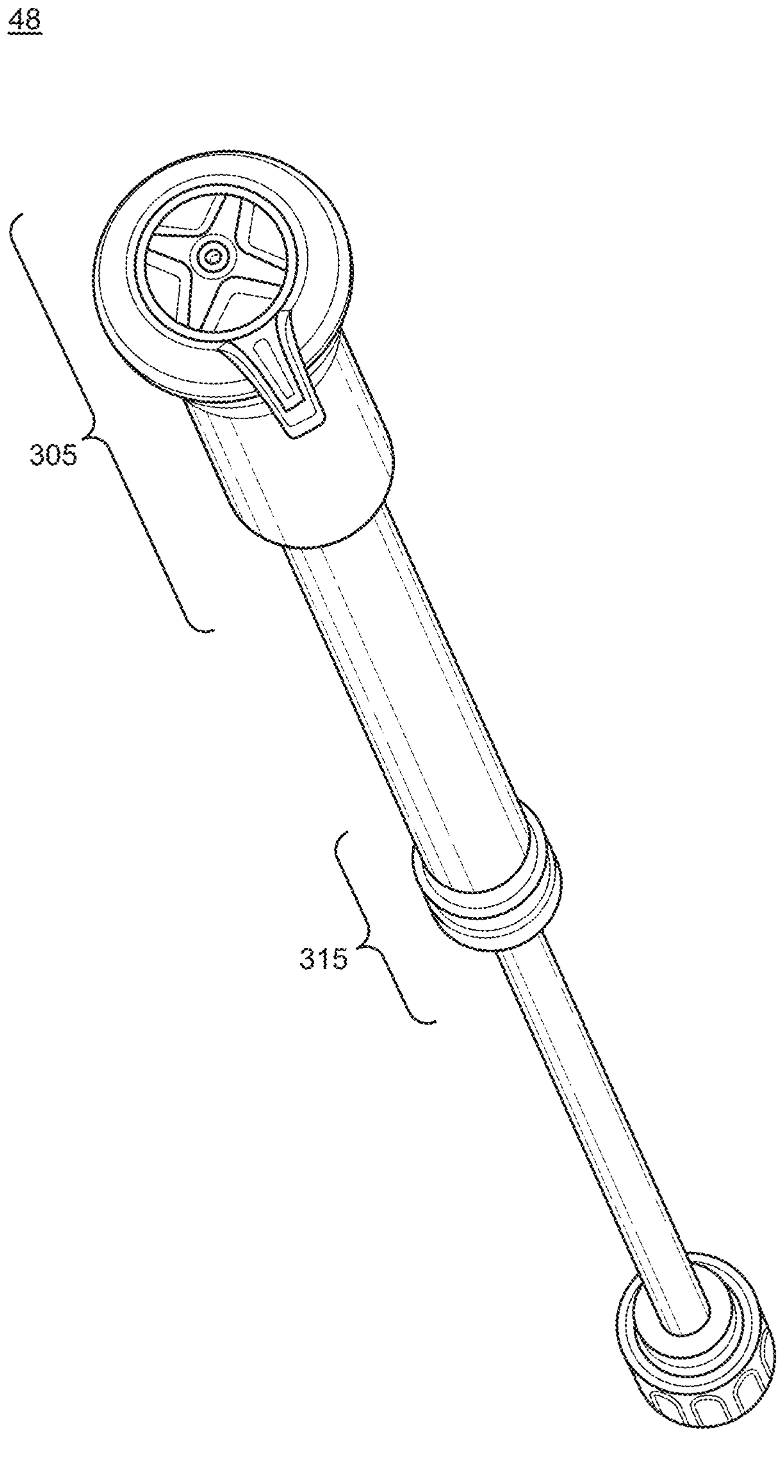
FIG. 3A is a perspective view of the shock assembly with a first fluid circuit valve coupled to a second fluid circuit, in accordance with one embodiment.

With reference now to FIG. 3A, a perspective view of the shock assembly 48 is provided wherein a first fluid circuit valve is coupled to a second fluid circuit disposed within the front fork assembly 102. At FIG. 3B, a cutaway view of the shock assembly 48 is provided wherein a first fluid circuit valve is coupled to a second fluid circuit disposed within the front fork assembly 102. In FIG. 3C a cutaway view of the shock assembly 48 is provided wherein the cutaway of FIG. 3C is performed with shock assembly 48 rotated 90 degrees with respect to the position at which the cutaway of FIG. 3B was performed.

Figure 3B:
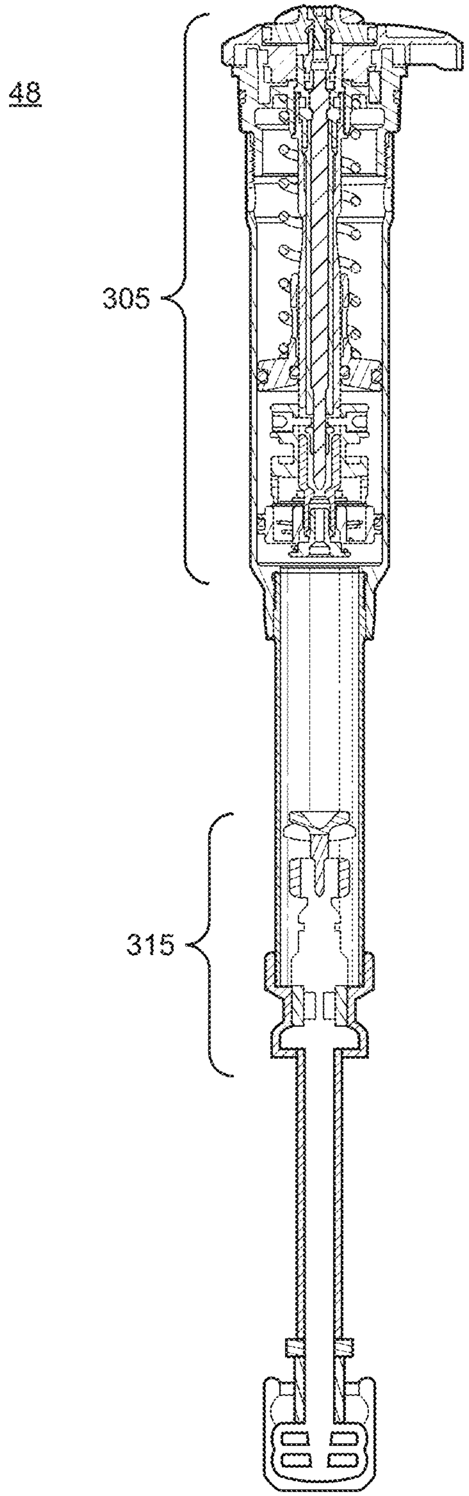
FIG. 3B is a cutaway view of the shock assembly with a first fluid circuit valve coupled to the second fluid circuit of FIG. 3A, in accordance with one embodiment.
Figure 3C:
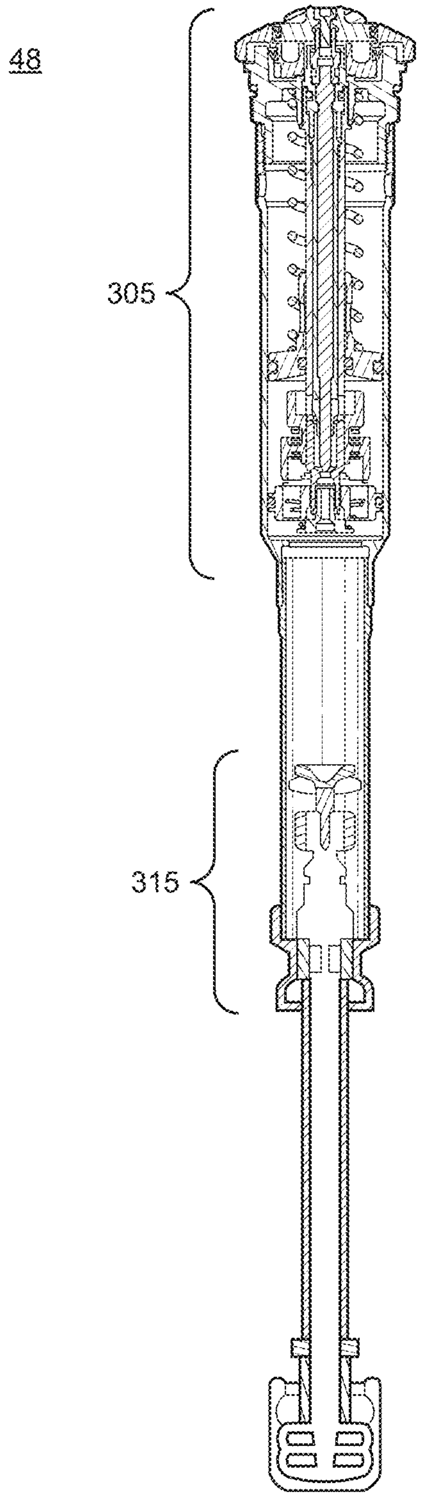
FIG. 3C is a cutaway view of the shock assembly with a first fluid circuit valve coupled to the first fluid circuit of FIG. 3B rotated 90 degrees, in accordance with one embodiment.

In one embodiment, FIGS. 3A-3C show shock assembly 48 having a top cap base valve assembly 305 and a mid-valve rebound shaft assembly 315. Further description of the top cap base valve assembly 305 and the operation thereof is provided in FIG. 4A-6C.

Although the discussion utilizes a shock assembly 48 (e.g., a FOX GripX shock assembly) for a front fork assembly 102, this is for purposes of clarity. In another embodiment, the first fluid circuit valve is coupled to the second fluid circuit and is incorporated into other shock assemblies and/or components thereof for similar or different applications such as, but not limited to an exoskeleton, a seat frame, a prosthetic, an orthotic, a suspended floor, and the like. Further, the present shock assembly with the first fluid circuit valve coupled to a second fluid circuit is incorporated into vehicles such as, but not limited to a road bike, a mountain bike, a gravel bike, an electric bike (e-bike), a hybrid bike, a scooter, a motorcycle, an ATV, a personal water craft (PWC), an aircraft, a single wheeled vehicle, a four-wheeled vehicle, a multi-wheeled vehicle, a snow mobile, a UTV such as a side-by-side, and the like. Examples of different shock assemblies and utilizations are disclosed in U.S. Pat. Nos. 6,296,092; 7,374,028; 9,033,122; 9,120,362; 9,239,090; 9,353,818; 9,623,716; 10,036,443; 10,427,742; 10,576,803 and 11,091,215 the contents of which are incorporated by reference herein, in their entirety.

In one embodiment, shock assembly 48 will include a remote reservoir. Additional descriptions and details of reservoir structure and operation are described in U.S. Pat. No. 7,374,028 the content of which is incorporated by reference herein, in its entirety.

Figure 4A:
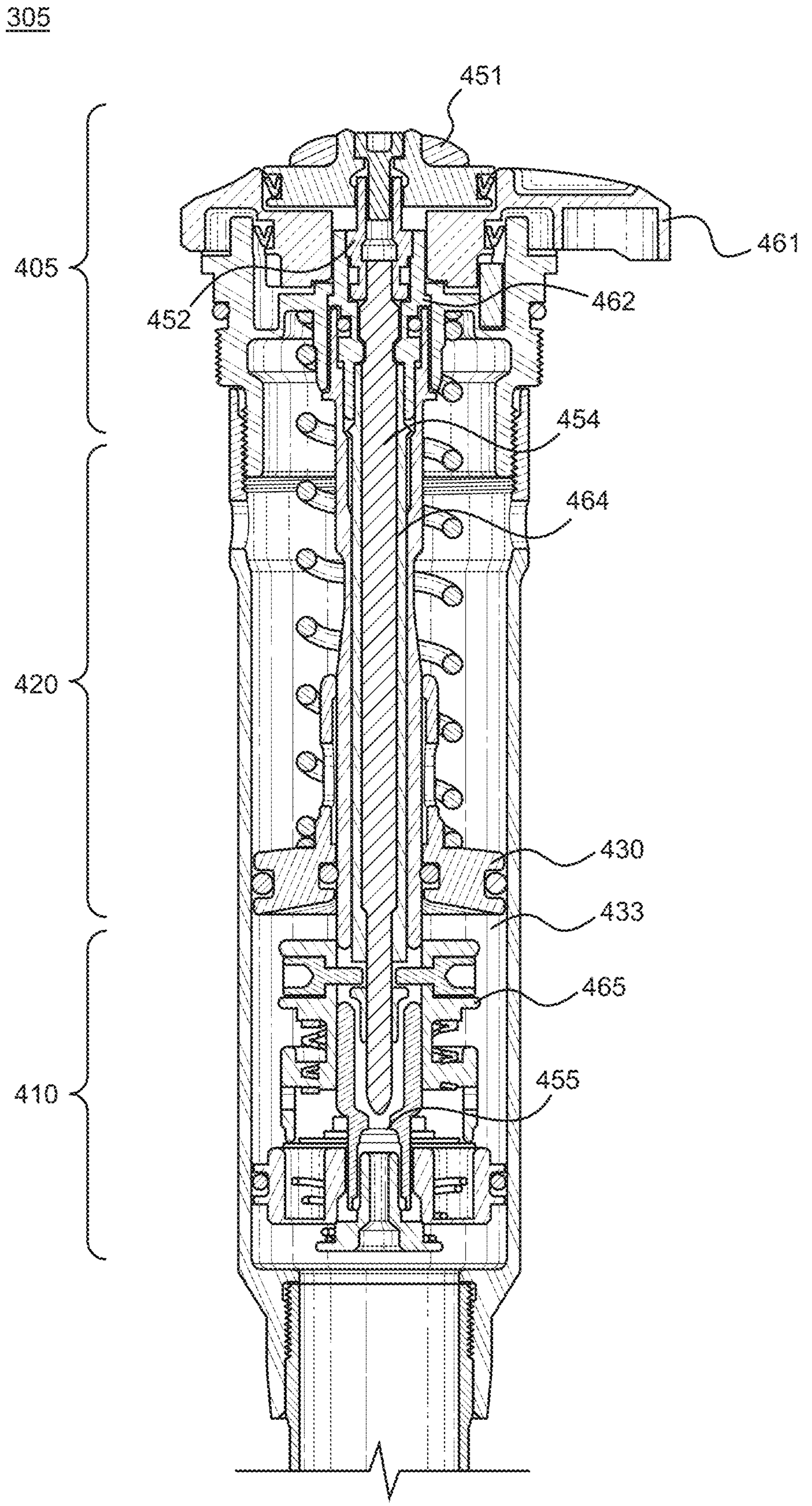
FIG. 4A is a cut away side view of the top cap base valve assembly of FIGS. 3A-3C, in accordance with one embodiment.
Figure 4B:
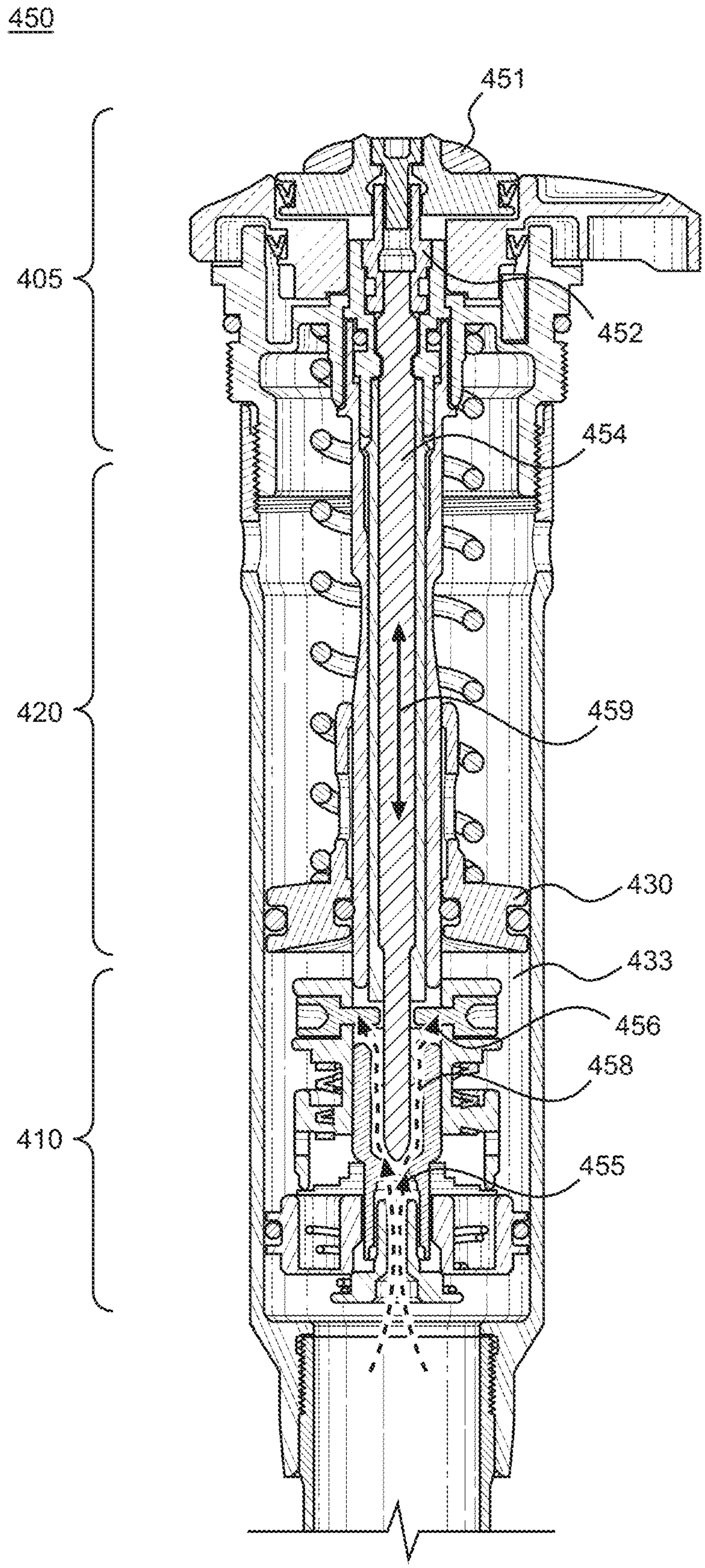
FIG. 4B is a cut away side view of the top cap base valve assembly of FIG. 4A illustrating the first fluid circuit valve assembly, shown in accordance with one embodiment.
Figure 4C:
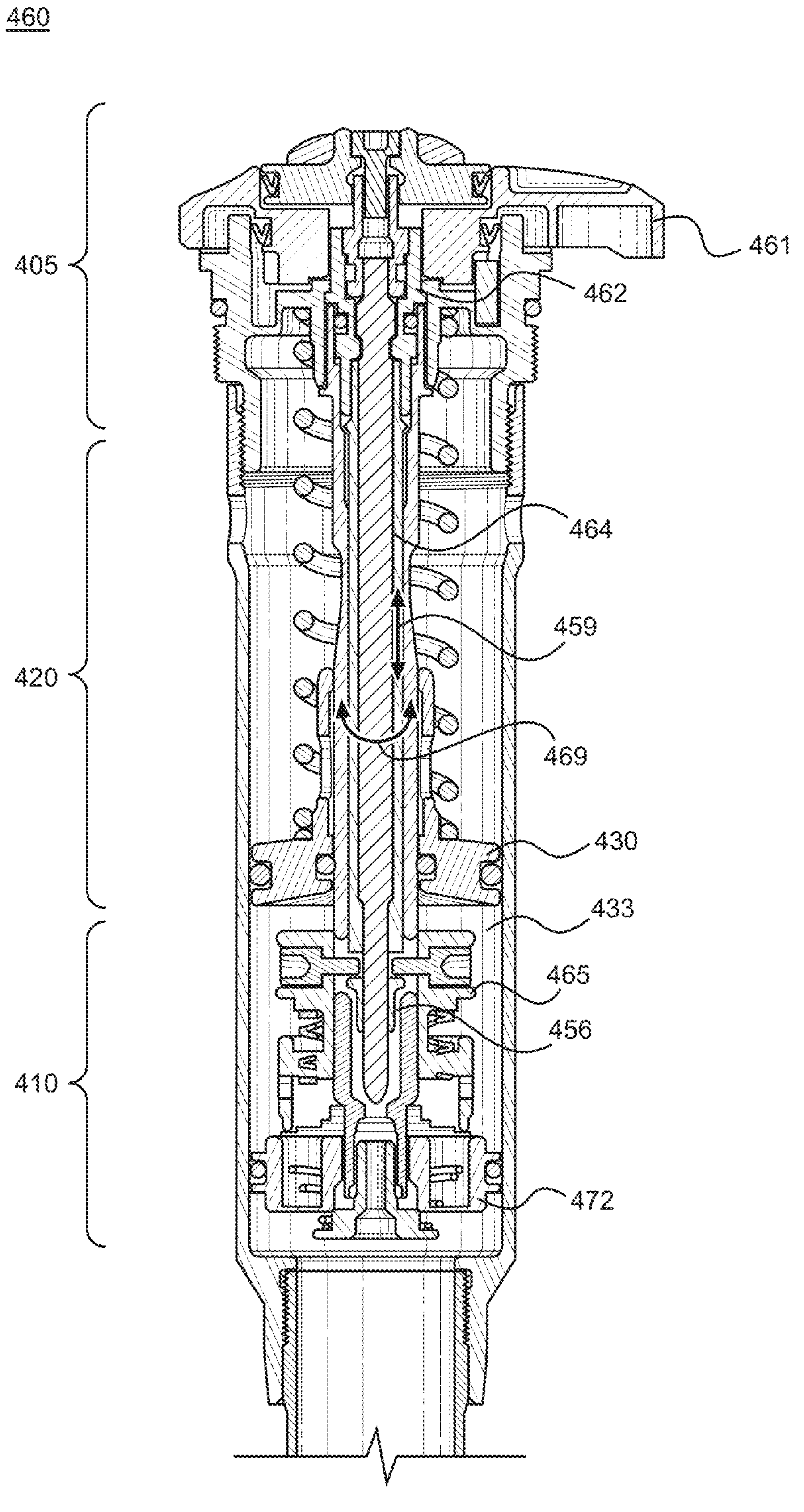
FIG. 4C is a cut away side view of the top cap base valve assembly of FIG. 4A illustrating the second fluid circuit valve assembly, in accordance with one embodiment.

With reference now to FIG. 4A, a cut away side view of the top cap base valve assembly 305 of FIGS. 3A-3C is shown in accordance with one embodiment. FIG. 4B is a cut away side view of the top cap base valve assembly of FIG. 4A and illustrating the first fluid circuit. FIG. 4C is a cut away side view of the top cap base valve assembly of FIG. 4A illustrating the second fluid circuit, in accordance with one embodiment.

With reference now to FIG. 4A, in one embodiment, the top cap base valve assembly 305 includes a top cap assembly 405, a shaft assembly 420, and a base valve assembly 410.

In general operation, the top cap assembly 405 provides the adjustment capability for the first fluid circuit and second fluid circuit.

In general, first fluid circuit adjustments are used to control shock assembly performance during rider weight shifts, braking, G-outs, and other slow inputs. In contrast, second fluid circuit adjustments are generally used to control shock assembly performance during bigger hits, landings, square-edged bumps, and the like.

Often, the first fluid circuit is utilized as part of the sag setup of the vehicle. Once the first fluid circuit is set, it is usually not necessary to adjust the first fluid circuit during a ride. However, there are times when being able to close and/or adjust a flow of the first fluid circuit is valuable. For example, during a bouncing part of a ride (e.g., rider standing up and pedaling, vehicle traversing rolling bumpy terrain, whoops, etc.) the first fluid circuit can allow some of the force being provided to the drive wheel(s) to be deleteriously dissipated by the shock assembly.

For example, when a rider is riding a bicycle on dirt, gravel, or other loose/slippery terrain, and the rider is standing on the pedals 11 (e.g., starting, sprint, hill ascent, etc.) instead of all of the rider's input being translated to drive wheel output, the shock assembly can absorb some of the energy provided to the pedals 11 resulting in what is known as pedal bob. The pedal bob will cause the vehicle to be heavier and lighter with respect to the ground as the rider pedals (e.g., the shock assembly will compress and rebound through the pedal bob). As the shock assembly compresses and rebounds, and the force of the drive wheel against the terrain similarly changes. As such, when there is less force pushing the drive wheel into the terrain, the drive wheel can break free of lower friction terrain causing wheel spin. This wheel spin will result in obvious loss of drive. Pedal bob will also make it difficult for the rider to pedal as the suspension compresses quickly at the start of the pedal stoke and can start to return while the rider is still performing the pedal downstroke. This upward movement of the suspension within the downstroke of the pedal motion is disrupting to both the timing and ability for the rider to find a cadence and/or rhythm while laying down power.

This situation similarly occurs if the vehicle is going over rolling bump type terrain, whoops, etc., where the shock assemblies are in a somewhat rhythmic compression and rebound cycle. Again, as the shock assemblies compress and rebound, and the force of the drive wheel(s) against the terrain similarly changes, when there is less force pushing the drive wheel(s) into the terrain, the drive wheel(s) can break free of lower friction terrain causing wheel spin. This wheel spin will result in obvious loss of drive and make it difficult for the rider to lay down power through the pedal with the suspension returning on the downstroke.

By closing the first fluid circuit, such as during a bouncing part of a ride, hill climb, etc., the characteristics of the shock assembly dominated by the first fluid circuit will basically be locked out. That is, the shock assembly will reduce or stop, for example, fluid flow through the first fluid circuit and, in so doing, reduce or remove the changes in force pushing the drive wheel into the terrain. As such, the vehicle will have reduced or no wheel spin and the rider better able to lay down consistent power with slowed pedal downstroke movement resulting in better drive efficiency.

Once the vehicle is past the hill climb or undulating terrain, the first fluid circuit is then returned to its pre-adjusted first fluid circuit ride setting with the second fluid circuit adjusted out of firm position, in one embodiment.

In contrast, the second fluid circuit might include position adjustment settings (e.g., 3 position adjustments for example) or an infinitely adjustable range of settings (e.g., from an open second fluid circuit to a closed second fluid circuit) that are used to provide on-the-fly adjustments to the shock assembly performance. That is, different levels of shock assembly performance for different terrain, environments, events, and the like encountered over a given ride (or drive, ski, float, etc.). For example, the second fluid circuit would be in an open position during rough descending and the like, a middle or medium mode would be used for undulating terrain, and a closed position or firm mode would be used for climbing.

With reference still to FIG. 4A, in one embodiment, the adjustment capability utilizes an externally adjustable feature (e.g., first fluid circuit adjuster 451 and/or second fluid circuit adjuster 461), such as a knob, button, lever, switch, electronic display, IVI, computing device, or the like which can be manually manipulated by a user to change one or a plurality of damping characteristics of shock assembly 48. In one embodiment, the manual adjustment capability is located with top cap assembly 405. In one embodiment, the adjustment capability is located remote from top cap assembly 405 such as a lever on a handlebar, bike frame, etc. In one embodiment, the remote adjustment capability is coupled with shock assembly 48 via a physical connection (e.g., cable, hydraulic, wired, etc.). In one embodiment, the remote adjustment capability is wirelessly coupled with shock assembly 48.

In one embodiment, the top cap assembly 405 has an electronic adjustment capability in addition to (or in place of) the adjustment capability discussed above. For example, an electronic adjustment capability includes a solenoid (or the like) to seat (e.g., close and/or adjust a flow of), partially unseat (e.g., mid), or fully unseat (e.g., open) a needle (or the like) with respect to a valve seat for one or both of the first fluid circuit and the second fluid circuit. In one embodiment, the electronic adjustment capability is coupled with shock assembly 48 via a physical connection (e.g., cable, hydraulic, wired, etc.). In one embodiment, the electronic adjustment capability is wirelessly coupled with shock assembly 48.

In one embodiment, first fluid circuit adjuster 451 and/or second fluid circuit adjuster 461 are presented and controlled via a graphical user interface (GUI) and/or human machine interface (HMI) such as an infotainment system HMI/GUI (e.g., in-vehicle infotainment (IVI) system, or the like) where the IVI system or other device will provide an ability for the user to modify one or more of the damping characteristics. Further discussion and examples of an IVI control system and componentry are described in U.S. Pat. No. 10,933,710, the content of which is incorporated by reference herein, in its entirety.

In one embodiment, shaft assembly 420 includes a number of components located axially along a portion of the shock assembly 48. In one embodiment, an air spring type internal floating piston (IFP) 430 is located about the shaft assembly 420 and separates the reservoir 433 from the IFP air spring. In another embodiment, instead of (or in addition to) an IFP, an emulsion, bladder, or the like is utilized.

In one embodiment, base valve assembly 410 includes a number of components and valves as discussed in further detail herein.

With reference again to FIG. 4B, in one embodiment, the first fluid circuit valve assembly 450 includes a first fluid circuit adjuster 451, coupler 452, adjuster shaft 454, and first fluid circuit port 455. As described herein, in one embodiment first fluid circuit adjustments are used to adjust body motion and the like, and are utilized for fork shaft velocities of approximately zero to twenty or thirty inches per second. In one embodiment, the fork velocity would be based upon wheel speed and not be subject to linkage ratios or the like.

In one embodiment, the first fluid circuit adjuster 451 is a knob threadedly coupled with coupler 452 via a threaded connection, fastener, screw, etc. and coupler 452 is fixedly coupled with adjuster shaft 454. In one embodiment, when first fluid circuit adjuster 451 is rotated, coupler 452 rotates adjuster shaft 454 to move it up or down (depending upon the direction of rotation) with respect to top cap 405 as shown by directional arrow 459. In one embodiment, e.g., to close and/or adjust a flow of the first fluid circuit valve assembly 450, first fluid circuit adjuster 451 is rotated such that coupler 452 rotates adjuster shaft 454 to move it down toward first fluid circuit port 455. As adjuster shaft 454 moves downward, adjuster shaft 454 will begin to close first fluid circuit port 455 reducing the flow therethrough. When the first fluid circuit valve assembly 450 is fully closed, adjuster shaft 454 will be seated (and operationally block fluid flow through) with respect to first fluid circuit port 455. In some embodiments, coupler 452 is optional. In some embodiments, first fluid circuit adjuster 451 is coupled to adjuster shaft 454. In some embodiments, coupler 451 is formed as one piece with first fluid circuit adjuster 451. In some embodiments, adjustor shaft 454 is actuated by a cam.

In contrast, in one embodiment, e.g., to open the first fluid circuit valve assembly 450, first fluid circuit adjuster 451 is rotated (in the opposite direction of rotation) such that coupler 452 rotates adjuster shaft 454 to move it upward away from first fluid circuit port 455. As adjuster shaft 454 moves upward, the adjuster shaft 454 will move out of its seat in first fluid circuit port 455 opening the flow therethrough. When the first fluid circuit valve assembly 450 is fully opened, the adjuster shaft 454 will be unseated with first fluid circuit port 455.

For example, when the first fluid circuit valve assembly 450 is open, the fluid will flow as shown by first fluid circuit flow path 458 into the base valve through first fluid circuit port 455 and out through secondary first fluid circuit valve 456. In contrast, when the first fluid circuit valve assembly 450 is closed, first fluid circuit port 455 will not allow the fluid to flow along first fluid circuit fluid flow path 458.

In one embodiment, first fluid circuit adjuster 451 is used for manually adjusting the setting of first fluid circuit valve assembly 450. In one embodiment, first fluid circuit valve assembly 450 is adjustable via a powered component such as a solenoid, stepper motor, electric motor, or the like. In one embodiment, first fluid circuit valve assembly 450 is adjustable via both manually such as by first fluid circuit adjuster 451 and electrically such as by a solenoid, stepper motor, electric motor, or the like. In one embodiment, first fluid circuit adjuster 451 includes one or more hard stops to ensure the first fluid circuit adjustment isn't rotated too far in either direction. For example, the stops will ensure a user (or electric motor) doesn't over-rotate and deleteriously affect the operation of first fluid circuit valve assembly 450.

In one embodiment, first fluid circuit adjuster 451 will include numbers, arrows, and/or other identifying features that will allow a user to visually identify one or more predefined settings, directions to turn the knob for different performance aspects, and the like. In one embodiment, first fluid circuit adjuster 451 will include dents, grooves, or the like that will provide haptic feedback to a user turning the knob. In one embodiment, first fluid circuit adjuster 451 will include a range shifting capability to allow the range of the adjustment of first fluid circuit valve assembly 450 to be modified.

Figure 4D:
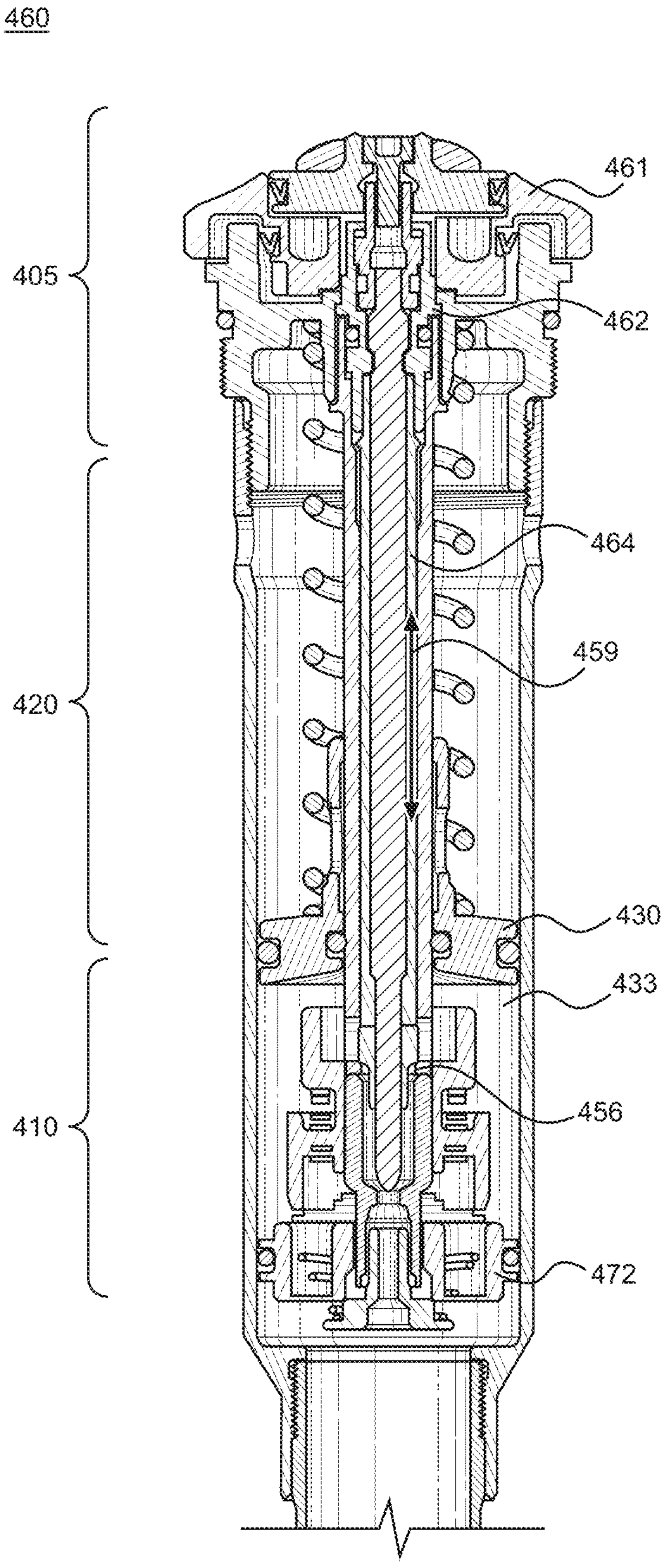
FIG. 4D is a cut away side view of the top cap base valve assembly of FIG. 4C rotated 90 degrees, in accordance with one embodiment.

With reference again to FIG. 4C, in one embodiment, the second fluid circuit valve assembly 460 includes a second fluid circuit adjuster 461, coupler 462, adjuster shaft 464, and adjuster circuit 465. FIG. 4D is an embodiment of FIG. 4C rotated 90 degrees. As discussed herein, second fluid circuit adjustments are used to deal with shock shaft velocities that are greater than twenty to thirty inches per second, such as square edge impacts, and the like. In some embodiments, coupler 462 is optional. In some embodiments, second fluid circuit adjuster 461 is coupled to adjuster shaft 464. In some embodiments, coupler 461 is formed as one piece with second fluid circuit adjuster 461. In some embodiments, adjuster shaft 464 is actuated by a cam.

In one embodiment, second fluid circuit adjuster 461 is used for manually adjusting the second fluid circuit setting of adjuster circuit 465. In one embodiment, adjuster circuit 465 is adjustable via a powered component such as a solenoid, stepper motor, electric motor, or the like. In one embodiment, adjuster circuit 465 is adjustable via both manually such as by second fluid circuit adjuster 461 and electrically such as by a solenoid, stepper motor, electric motor, or the like. In one embodiment, second fluid circuit adjuster 461 includes one or more hard stops to ensure the second fluid circuit adjuster isn't rotated too far in either direction. For example, the stops will ensure a user (or electric motor) doesn't over-rotate and deleteriously affect the operation of adjuster circuit 465.

In one embodiment, second fluid circuit adjuster 461 will include a shape, numbers, arrows, and/or other identifying features that will allow a user to visually identify one or more predefined settings, directions to turn the knob for different performance aspects, and the like. In one embodiment, second fluid circuit adjuster 461 will include dents, grooves, or the like that will provide haptic feedback to a user turning the knob. In one embodiment, second fluid circuit adjuster 461 will include a range shifting capability to allow the range of the adjustment of adjuster circuit 465 to be modified.

With reference now to FIGS. 4C and 4D, in one embodiment, adjuster shaft 464 is located axially about the interior of the shaft and has a hollow core to allow the insertion and movement of adjuster shaft 454 therethrough.

In one embodiment, the second fluid circuit adjuster 461 is coupled with coupler 462 via a press connection or the like. Coupler 462 is coupled with adjuster shaft 464. In one embodiment, when second fluid circuit adjuster 461 is rotated, coupler 462 will rotate adjuster shaft 464 causing adjuster shaft 464 to move up or down (depending upon the direction of rotation) as shown by directional arrow 459 to change the second fluid circuit valve assembly 460 compression settings (shown and described in further detail herein). In some embodiments, when second fluid circuit adjuster 461 is manipulated, adjuster shaft 464 is actuated by a cam and is moved axially.

In one embodiment, instead of coupler 462 rotating adjuster shaft 464 and causing adjuster shaft 464 to move up or down (as shown by directional arrow 459), when second fluid circuit adjuster 461 is rotated, coupler 462 will rotate adjuster shaft 464 as shown by rotational directional arrow 469 to change the second fluid circuit valve assembly 460 compression settings (shown and described in further detail herein).

In one embodiment, when second fluid circuit adjuster 461 is rotated, coupler 462 will rotate adjuster shaft 464 causing adjuster shaft 464 to move up or down (depending upon the direction of rotation) as shown by directional arrow 459 while also rotating adjuster shaft 464 as shown by rotational directional arrow 469 to change the second fluid circuit valve assembly 460 settings (e.g., the combination of operations shown and described in further detail herein).

In one embodiment, to increase the second fluid circuit valve assembly 460 settings (e.g., compression settings), second fluid circuit adjuster 461 is rotated such that coupler 462 rotates adjuster shaft 464 to move it down toward damping piston 472. As adjuster shaft 464 moves downward, adjuster shaft 464 will move adjuster circuit 465 toward damping piston 472. In contrast, in one embodiment, to decrease the second fluid circuit valve assembly 460 settings (e.g., compression settings), second fluid circuit adjuster 461 is rotated (in the opposite direction of rotation) such that coupler 462 rotates adjuster shaft 464 to move it upward away from damping piston 472. Further discussion of the parts and operation of adjuster circuit 465 are provided in the discussion of FIG. 5A.

Figure 5A:
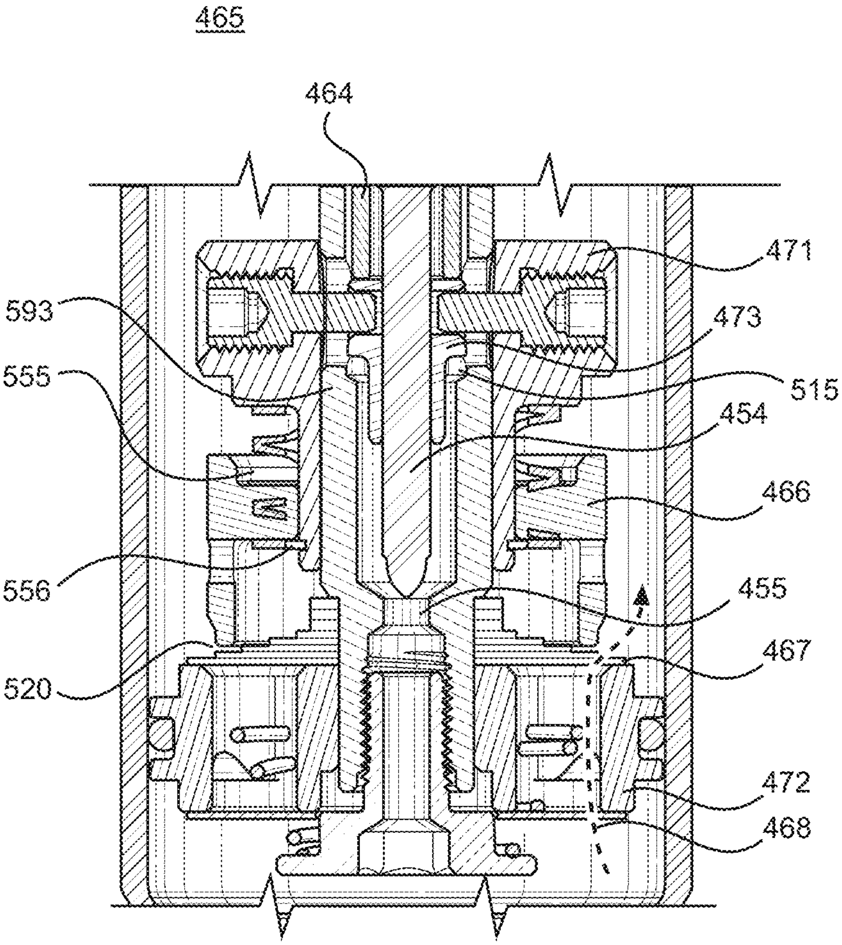
FIG. 5A is a cut away side view of the base valve assembly of FIG. 4A illustrating the adjuster of the second fluid circuit valve assembly, in accordance with one embodiment.
Figure 5B:
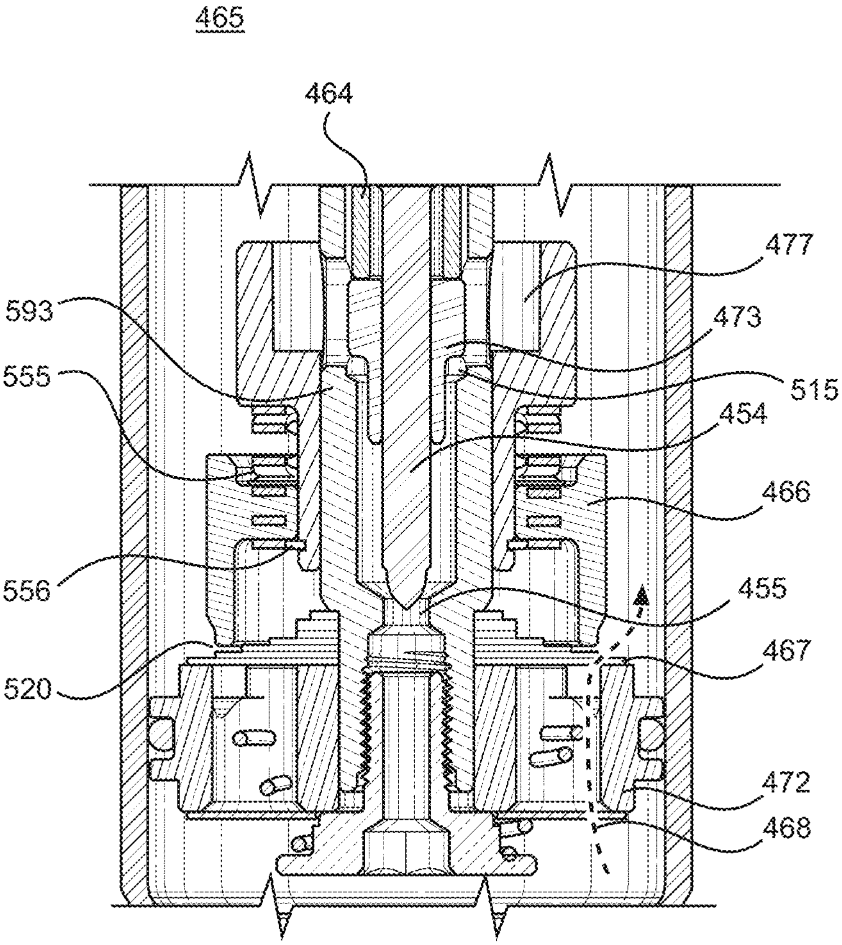
FIG. 5B is a cut away side view of the base valve assembly of FIG. 5A rotated 90 degrees, in accordance with one embodiment.

With reference now to FIG. 5A, a cut away side view of the base valve assembly 410 of FIG. 4A illustrating the adjuster circuit 465 of the second fluid circuit valve assembly 460 (of FIG. 4C). FIG. 5B is a cut away of 5A rotated 90° (of FIG. 4D) is shown in accordance with one embodiment.

Referring now to FIGS. 5A and 5B, in one embodiment, adjuster circuit 465 includes an upper assembly 471, a first fluid circuit valve plug 473 located axially about the interior of the shaft with a hollow core to allow the insertion and movement of adjuster shaft 454 therethrough, a secondary first fluid circuit port 515, a first fluid circuit outlet 477, a preload hat 466, shims 467, adjustable second fluid circuit preload spacer(s) 555, and adjustable second fluid circuit position spacer(s) 556.

In one embodiment, first fluid circuit valve plug 473 is coupled with adjuster shaft 464 and moves up or down within base valve assembly body 593 as adjuster shaft 464 moves up or down. First fluid circuit outlet 477 is fixedly coupled with first fluid circuit valve plug 473 which are coupled (in one embodiment, threadedly coupled) with upper assembly 471. In one embodiment, upper assembly 471 is fixedly coupled with preload hat 466.

As such, when adjuster shaft 464 moves up or down first fluid circuit valve plug 473, first fluid circuit outlet 477, upper assembly 471, and preload hat 466 also move up and down.

In one embodiment, damping piston 472 is coupled with base valve assembly body 593. In one embodiment, damping piston 472 has a fluid pathway therethrough as shown by fluid path 468. In one embodiment, one or more shims 467 are coupled with base valve assembly body 593 and cover the top of the fluid pathway through damping piston 472.

In one embodiment, the adjustable second fluid circuit preload spacer(s) 555 are used to modify the spring force imparted by the spring located between the preload hat 466 and the upper assembly 471.

In one embodiment, the adjustable second fluid circuit position spacer(s) 556 are used to modify the location of preload hat 466 with respect to upper assembly 471 and the one or more shims 467.

Figure 6A:
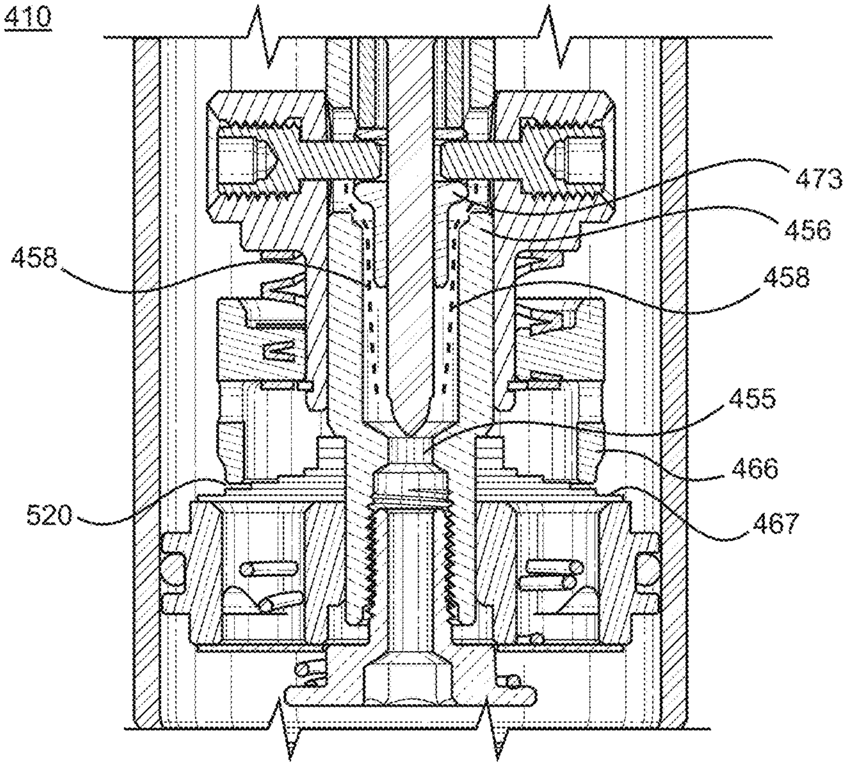
FIG. 6A is a cut away side view of the base valve assembly of FIG. 4A with the second fluid circuit valve in an open configuration, in accordance with one embodiment.

With reference now to FIG. 6A and to FIG. 4C, a cut away side view of the base valve assembly 410 of second fluid circuit valve assembly 460 is provided depicting the second fluid circuit in an open configuration.

For example, in one embodiment, when second fluid circuit valve assembly 460 is in its most open position, the adjuster shaft 464, first fluid circuit valve plug 473, first fluid circuit outlet 477, upper assembly 471, and preload hat 466 will be in their uppermost position. In one embodiment, there will be a space 520 between preload hat 466 and the one or more shims 467. As such, the second fluid circuit valve will open when the fluid pressure of the shock assembly surpasses the pressure required to unseat the one or more shims 467.

In addition, the secondary first fluid circuit valve 456 will be open to allow a fluid flow path 458 through the base valve assembly 410.

Figure 6B:
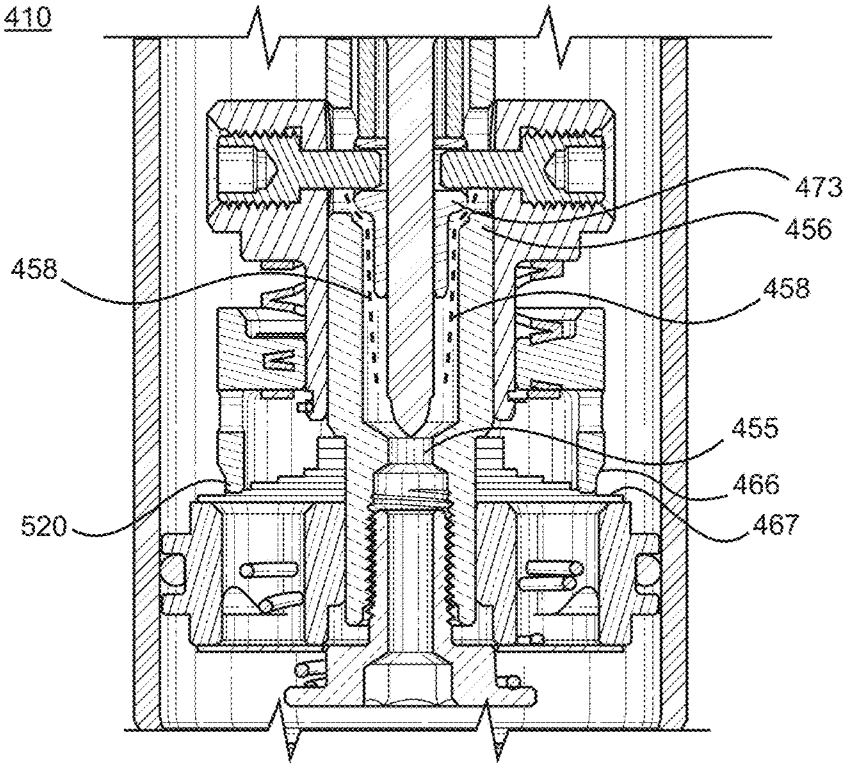
FIG. 6B is a cut away side view of the base valve assembly of FIG. 4A with the second fluid circuit valve in a medium configuration, in accordance with one embodiment.

With reference now to FIG. 6B and to FIG. 4C, a cut away side view of the base valve assembly 410 is provided depicting the second fluid circuit in a medium configuration.

In one embodiment, the second fluid circuit valve assembly 460 is moved to a medium position when second fluid circuit adjuster 461 (or other adjuster component) is moved to a firmer setting. In so doing, coupler 462 will rotate shaft 464 which will move down toward damping piston 472. The downward movement of adjuster shaft 464 will cause the first fluid circuit valve plug 473, first fluid circuit outlet 477, upper assembly 471, and preload hat 466 to move axially downward toward damping piston 472. In one embodiment, the space 520 between preload hat 466 and the one or more shims 467 will be reduced or removed completely. As such, the second fluid circuit valve will open when the fluid pressure of the shock assembly surpasses the pressure required to unseat the one or more shims 467 and the additional spring force required to move the preload hat 466 provided by the spring located between the preload hat 466 and the upper assembly 471.

In one embodiment, when the second fluid circuit adjuster 461 (or other adjuster component) is moved to a firmer setting, the secondary first fluid circuit valve 456 will remain open (and or unaffected) to allow fluid flow along first fluid circuit path 458 through the base valve assembly 410.

In one embodiment, when the second fluid circuit adjuster 461 (or other adjuster component) is moved to a firmer setting, the flow rate through the secondary first fluid circuit valve 456 will be influenced and/or partially adjusted thereby modifying the first fluid circuit flow path 458 (and thus the fluid flow) through the base valve assembly 410.

Figure 6C:
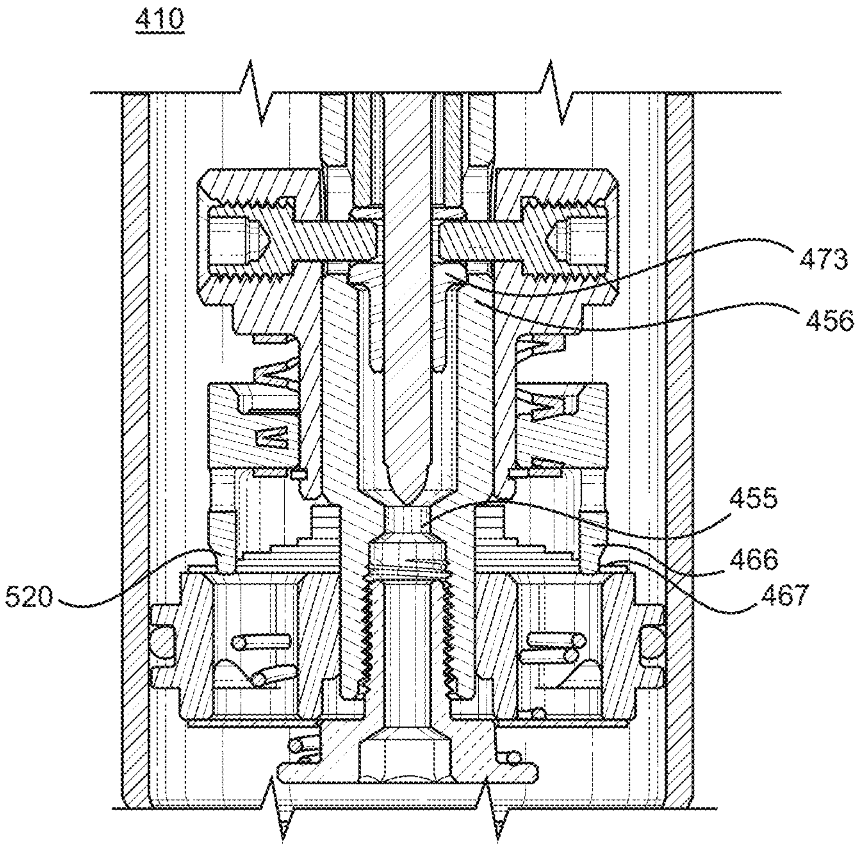
FIG. 6C is a cut away side view of the base valve assembly of FIG. 4A with the second fluid circuit valve in a closed configuration, in accordance with one embodiment.

With reference now to FIG. 6C and to FIG. 4C, a cut away side view of the base valve assembly 410 is depicted with the second fluid circuit in a closed configuration.

In one embodiment, as the second fluid circuit valve assembly 460 is moved to a closed position by turning second fluid circuit adjuster 461 (or other adjuster component) to the firmest setting. In so doing, coupler 462 will rotate shaft 464 which will move down toward damping piston 472. The downward movement of adjuster shaft 464, will cause the first fluid circuit valve plug 473, first fluid circuit outlet 477, upper assembly 471, and preload hat 466 to move axially downward toward damping piston 472. In one embodiment, the space 520 between preload hat 466 and the one or more shims 467 is removed and additional preload will be incurred by the further compression of the spring. As such, the second fluid circuit valve will open when the fluid pressure of the shock assembly surpasses the pressure required to unseat the one or more shims 467 and the additional spring force required to move the preload hat 466.

In addition, when the first fluid circuit valve plug 473 is in its lowest position, the secondary first fluid circuit valve 456 will be closed. As such, regardless of the first fluid circuit valve assembly 450 setting, the first fluid circuit flow path 458 through the base valve assembly 410 will be closed. In so doing, by closing the second fluid circuit, such as during a bouncing part of a ride, hill climb, etc., the first fluid circuit dominated characteristics of the shock assembly will also be locked out without requiring any manipulation of the first fluid circuit valve assembly 450.

Moreover, once the vehicle is past the hill climb or undulating terrain, or the like, and the user opens or partially opens the second fluid circuit valve assembly, the first fluid circuit flow path will also be open. As such, the user can obtain first fluid circuit lockout without adjusting the first fluid circuit valve assembly 450 thereby maintaining the first fluid circuit at its pre-adjusted ride setting.

Figure 7A:
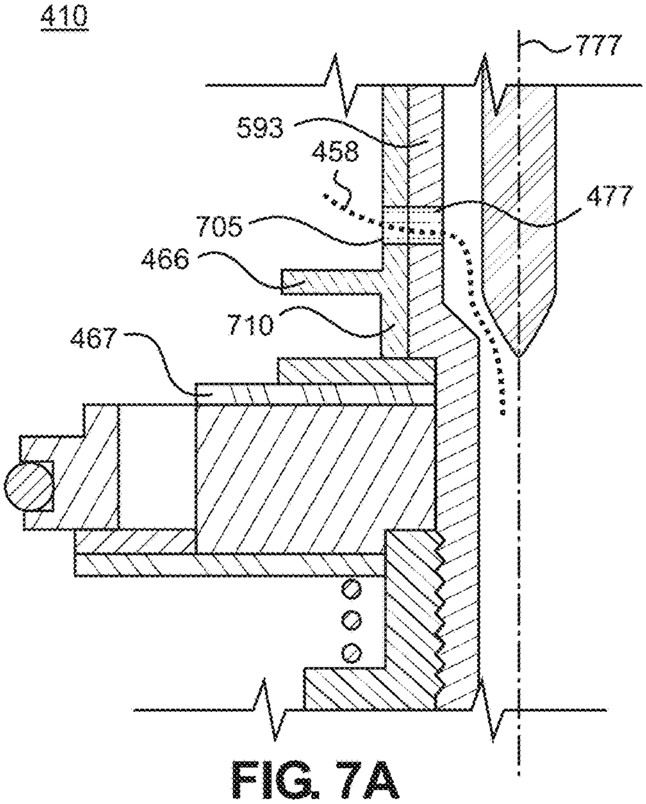
FIG. 7A is a cut away side view of the base valve assembly with the second fluid circuit valve in an open configuration with first fluid circuit rotational shaft valve control, in accordance with one embodiment.

With reference now to FIG. 7A, a cut away side view of the base valve assembly 410 is provided with the second fluid circuit in an open configuration and with a rotational shaft control of the first fluid circuit valve. In one embodiment, when second fluid circuit adjuster 461 is rotated, coupler 462 is coupled with the adjuster shaft which is coupled with preload hat 466, such that when second fluid circuit adjuster 461 is rotated, preload hat 466 will also rotate, as shown by rotational directional arrow 469, to change the second fluid circuit valve assembly 460 setting.

In one embodiment, the coupler 462 is optional. For example, in one embodiment, the second fluid circuit adjuster 461 is coupled with coupler 462 via a press connection or the like and coupler 462 is coupled with preload hat 466 such that when second fluid circuit adjuster 461 is rotated, coupler 462, and preload hat 466 will rotate.

However, in another embodiment, e.g., where there is no optional coupler 462, the second fluid circuit adjuster 461 is coupled with the adjuster shaft which is coupled with preload hat 466 via a press connection (threaded connection, epoxy, mechanical connection, or the like) such that when second fluid circuit adjuster 461 is rotated, preload hat 466 will also rotate.

In one embodiment, preload hat 466 has an opening 705 (e.g., a slot port, or the like) at a portion thereof such that when rotated (e.g., 90 degrees, 180 degrees, etc.) it either opens, covers, or partially covers first fluid circuit outlet 477 to provide a secondary control of the first fluid circuit valve.

Figure 7B:
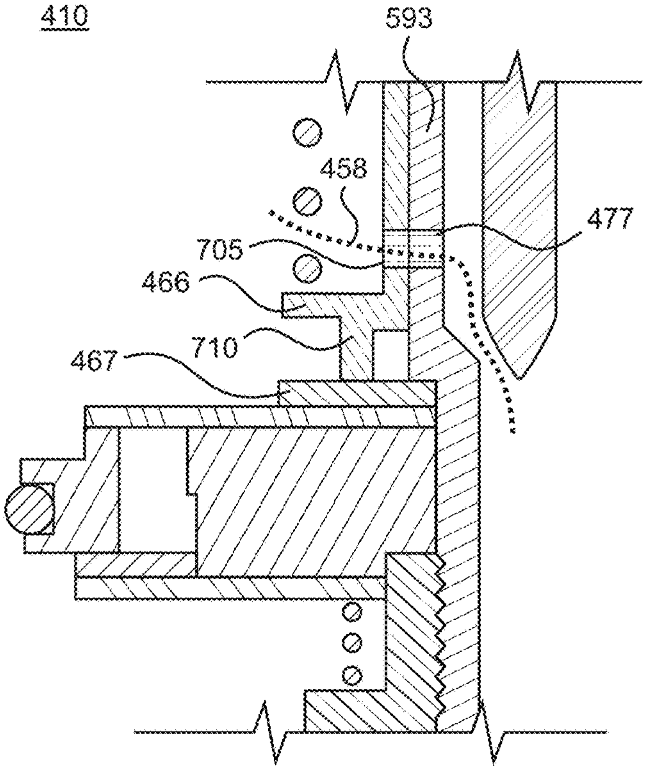
FIG. 7B is a cut away side view of the base valve assembly with the second fluid circuit valve in a medium configuration with first fluid circuit rotational shaft valve control, in accordance with one embodiment.
Figure 7C:
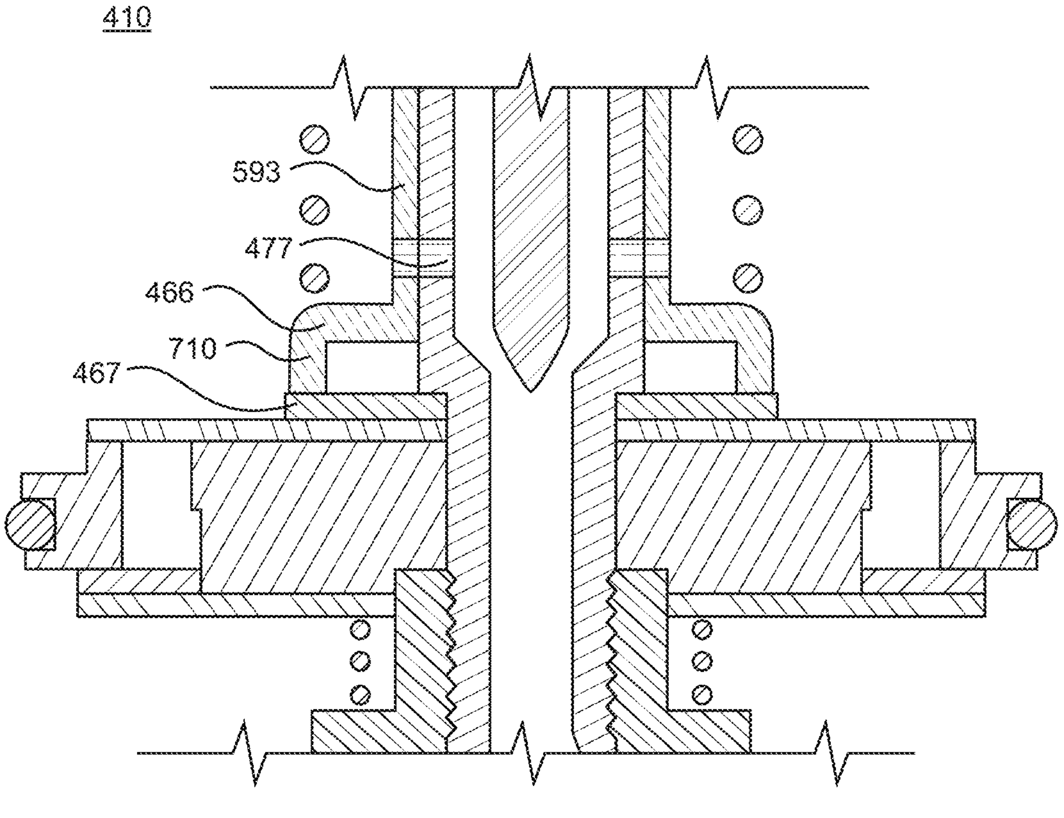
FIG. 7C is a cut away side view of the base valve assembly with the second fluid circuit valve in a closed configuration with first fluid circuit rotational shaft valve control, in accordance with one embodiment.

In one embodiment, the opening 705 has a constant size along the range of rotation of the preload hat 466. For example, first fluid circuit outlet 477 is either unencumbered by preload hat 466 as the opening 705 and first fluid circuit outlet 477 are aligned (and/or similarly sized) or first fluid circuit outlet 477 is blocked by preload hat 466 when it is rotated such that opening 750 is no longer aligned with first fluid circuit outlet 477 (as shown in FIG. 7C).

In one embodiment, opening 705 has a changing size along some or all of the range of rotation of preload hat 466. For example, depending upon the rotational position of preload hat 466, the opening 705 will interact with the first fluid circuit outlet 477 such that the first fluid circuit outlet 477 is unencumbered, partially blocked, and/or fully blocked.

In one embodiment utilizing rotational shaft control of second fluid circuit valve, preload hat 466 operates similar to the operation as disclosed in FIGS. 6A-6C. That is, the rotation of preload hat 466 will cause preload hat 466 to move up or down (e.g., toward or away from shims 467).

In one embodiment, preload hat 466 has a rotationally differing cross section. For example, in one embodiment, the bottom 710 of preload hat 466 (e.g., the portion closest to shims 467) will move away from the central axis 777 as preload hat 466 is rotated. In other words, when second fluid circuit adjuster 461 is rotated, preload hat 466 will also rotate which will change the location of the bottom 710 of preload hat 466 with respect to shims 467. Thus, in the most open position of second fluid circuit valve assembly 460 (as shown in FIG. 7A), the bottom 710 of the preload hat 466 will be closest to the base valve assembly body and be providing the least modification to the unseat pressure of the one or more shims 467. In contrast, as the second fluid circuit valve assembly 460 begins to be closed, the rotation of the preload hat 466 will cause the bottom 710 of the preload hat 466 to be further away from the base valve assembly body 593 and be providing an additional force thereby changing the unseat pressure of the one or more shims 467 (as shown in FIG. 7B). Finally, as the second fluid circuit valve assembly 460 is moved to the closed position, the rotation of the preload hat 466 will cause the bottom 710 of the preload hat 466 to be even away from base valve assembly body 593 and be providing the maximum unseat pressure for the one or more shims 467 (as shown in FIG. 7C).

With reference again to FIG. 7A, in one embodiment, when second fluid circuit valve assembly 460 is in its most open position, the opening 705 in preload hat 466 will be aligned with the first fluid circuit outlet 477 such that the first fluid circuit outlet 477 is unencumbered with respect to the second fluid circuit valve assembly 460.

In one embodiment, e.g., when the preload hat is operating by moving up and down (as indicated by directional arrow 459 of FIG. 4C) there will be a space 520 between preload hat 466 and the one or more shims 467 (as shown in FIG. 6A). As such, the second fluid circuit valve will open when the fluid pressure of the shock assembly surpasses the pressure required to unseat the one or more shims 467.

In one embodiment, e.g., when the preload hat 466 has a rotationally differing cross section, the bottom 710 of the preload hat 466 will be closest to the base valve assembly body 593 and be providing the least modification to the unseat pressure of the one or more shims 467. As such, the second fluid circuit valve will open when the fluid pressure of the shock assembly surpasses the pressure required to unseat the one or more shims 467.

With reference now to FIG. 7B and to FIGS. 4A-4D, a cut away side view of the base valve assembly 410 is provided depicting the second fluid circuit in a medium configuration, and depicting the first fluid circuit valve having rotational shaft control.

In one embodiment, the second fluid circuit valve assembly 460 is moved to a medium position when second fluid circuit adjuster 461 (or other adjuster component) is moved to a firmer setting.

In one embodiment, when second fluid circuit valve assembly 460 is in a middle position, the opening 705 in preload hat 466 will be aligned with the first fluid circuit outlet 477 such that the first fluid circuit outlet 477 is unencumbered with respect to the second fluid circuit valve assembly 460. In one embodiment, when the opening 705 has a changing size along some or all of the range of rotation of preload hat 466, the opening 705 will interact with the first fluid circuit outlet 477 such that the first fluid circuit outlet 477 is partially blocked. In one embodiment, this partial blockage may be limited to only the last portion of the rotation of second fluid circuit valve assembly 460 (e.g., as the valve approaches the closed position as discussed in FIG. 7C). Thus, in one embodiment, when the second fluid circuit adjuster 461 (or other adjuster component) is moved to a firmer setting, the flow rate of the secondary first fluid circuit valve 456 will be influenced and/or partially adjusted thereby modifying the first fluid circuit flow path 458 (and thus the fluid flow) through the base valve assembly 410.

In one embodiment, e.g., when the preload hat is operating by moving up and down (as indicated by directional arrow 459 of FIG. 4C), as second fluid circuit valve assembly 460 is moved toward a middle position, preload hat 466 will move axially downward toward damping piston 472 (as shown in FIG. 6B). In one embodiment, the space 520 between preload hat 466 and the one or more shims 467 will be reduced or removed completely. As such, the second fluid circuit valve will open when the fluid pressure of the shock assembly surpasses the pressure required to unseat the one or more shims 467 and the additional spring force required to move the preload hat 466 provided by the spring located between the preload hat 466 and the upper assembly 471.

In one embodiment, e.g., when the preload hat has a rotationally differing cross section, the bottom 710 of preload hat 466 will move away from the central axis 777 as second fluid circuit valve assembly 460 is moved to a firmer setting. In other words, when second fluid circuit adjuster 461 is moved to a firmer setting, preload hat 466 will rotate which will change the location of the bottom 710 of preload hat 466 with respect to shims 467 such that the bottom 710 of the preload hat 466 will be further away from the base valve assembly body 593 and be providing an additional force thereby changing the unseat pressure of the one or more shims 467. As such, the second fluid circuit valve will open when the fluid pressure of the shock assembly surpasses the pressure required to unseat the one or more shims 467 and the additional spring force required to move the preload hat 466. In some embodiments, the base valve assembly body is a compression shaft. With reference now to FIG. 7C and to FIGS. 4A-4D, a cut away side view of the base valve assembly 410 is provided depicting the second fluid circuit in a closed configuration with first fluid circuit valve having rotational shaft control.

In one embodiment, the second fluid circuit valve assembly 460 is moved to a closed position by turning second fluid circuit adjuster 461 (or other adjuster component, input, etc.) to the firmest setting.

In one embodiment, when second fluid circuit valve assembly 460 is in a closed position, the opening 705 in preload hat 466 will be miss-aligned with the first fluid circuit outlet 477 such that the first fluid circuit outlet 477 is encumbered (blocked, mostly blocked, adjusted, closed, etc.). Thus, in one embodiment, regardless of the setting of first fluid circuit valve assembly 450, the first fluid circuit flow path 458 through the base valve assembly 410 will be closed and/or adjusted. In so doing, by closing the second fluid circuit, such as during a bouncing part of a ride, hill climb, etc., the characteristics of the shock assembly which are dominated by the first fluid circuit will also be locked out without requiring any manipulation of the first fluid circuit valve assembly 450.

Moreover, once the vehicle is past the hill climb or undulating terrain, or the like, and the user opens or partially opens the second fluid circuit valve assembly 460, the first fluid circuit flow path will also be open. As such, the user can obtain first fluid circuit lockout without adjusting the first fluid circuit valve assembly 450 thereby maintaining the first fluid circuit at its pre-adjusted ride setting.

In one embodiment, e.g., when the preload hat is operating by moving up and down (as indicated by directional arrow 459 of FIG. 4C), as second fluid circuit valve assembly 460 is moved to a closed position, preload hat 466 will move axially downward toward damping piston 472 (as shown in FIG. 6C). In one embodiment, the space 520 between preload hat 466 and the one or more shims 467 is removed and additional preload will be incurred by the further compression of the spring. As such, the second fluid circuit valve will open when the fluid pressure of the shock assembly surpasses the pressure required to unseat the one or more shims 467 and the additional spring force required to move the preload hat 466.

In one embodiment, e.g., when the preload hat has a rotationally differing cross section, the bottom 710 of preload hat 466 will move away from the base valve assembly body 593 as second fluid circuit valve assembly 460 is moved to the closed position. In other words, when second fluid circuit adjuster 461 is moved to a closed setting, preload hat 466 will rotate which will change the location of the bottom 710 of preload hat 466 with respect to shims 467 such that the bottom 710 of the preload hat 466 will be at its furthest location away from the base valve assembly body 593 and be providing the maximum unseat pressure for the one or more shims 467. As such, the second fluid circuit valve will open when the fluid pressure of the shock assembly surpasses the pressure required to unseat the one or more shims 467 and the additional spring force required to move the preload hat 466.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

The invention claimed is:

1. A valve assembly configured to control a first fluid circuit and a second fluid circuit, said valve assembly comprising:

a second fluid circuit valve adjustor configured to actuate an adjustor shaft; and an adjustor circuit coupled with said adjustor shaft, wherein an input to said second fluid circuit valve adjustor translates into a movement of said adjustor shaft, said adjustor circuit comprising:

a second fluid circuit valve;

a secondary first fluid circuit valve disposed along a first fluid circuit flow path of a first fluid circuit valve, said secondary first fluid circuit valve configured to adjust a flow through said first fluid circuit flow path when said second fluid circuit valve adjustor is in a closed position;

a first fluid circuit valve plug coupled with said adjuster shaft and located within a base valve assembly body:

a first fluid circuit outlet fixedly coupled with said first fluid circuit valve plug;

an upper assembly coupled with said first fluid circuit outlet; and a preload hat coupled with said upper assembly, such that an axial movement of said adjuster shaft axially moves said first fluid circuit valve plug, said first fluid circuit outlet, said upper assembly, and said preload hat.

2. The valve assembly of claim 1, further comprising:

a coupler coupled with said second fluid circuit adjustor, wherein said adjustor shaft is coupled with said coupler.

3. The valve assembly of claim 1, wherein said secondary first fluid circuit valve does not adjust said flow through said first fluid circuit flow path when said second fluid circuit valve adjustor is in a position other than said closed position.

4. The valve assembly of claim 1, wherein said second fluid circuit valve adjustor modifies said first fluid circuit flow path when said second fluid circuit valve adjustor is in a position other than said closed position.

5. The valve assembly of claim 1, wherein said secondary first fluid circuit valve will adjust said flow of said first fluid circuit flow path when said second fluid circuit valve adjustor is in said closed position regardless of a setting of said first fluid circuit valve.

6. The valve assembly of claim 1, wherein said second fluid circuit valve adjustor is a manual adjustor.

7. The valve assembly of claim 1, wherein said second fluid circuit valve adjustor is electronic.

8. The valve assembly of claim 1, wherein said adjustor circuit comprises:

a spring located between said preload hat and said upper assembly; and at least one adjustable second fluid circuit preload spacer used to modify a preload spring force of said spring.

9. The valve assembly of claim 1, wherein said adjustor circuit comprises:

at least one adjustable second fluid circuit position spacer used to modify a location of said preload hat with respect to said upper assembly.

10. A damper assembly having a valve assembly configured to control a first fluid circuit and a second fluid circuit, said damper assembly comprising:

a second fluid circuit valve adjustor configured to actuate an adjustor shaft; and an adjustor circuit coupled with said adjustor shaft, wherein an input to said second fluid circuit valve adjustor translates into a movement of said adjustor shaft, said adjustor circuit comprising:

a second fluid circuit valve;

a secondary first fluid circuit valve disposed along a first fluid circuit flow path of a first fluid circuit valve, said secondary first fluid circuit valve configured to adjust a flow through said first fluid circuit flow path when said second fluid circuit valve adjustor is in a closed position;

a first fluid circuit valve plug coupled with said adjuster shaft and located within a base valve assembly body;

a first fluid circuit outlet fixedly coupled with said first fluid circuit valve plug;

an upper assembly coupled with said first fluid circuit outlet; and a preload hat coupled with said upper assembly, such that an axial movement of said adjuster shaft axially moves said first fluid circuit valve plug, said first fluid circuit outlet, said upper assembly, and said preload hat.

11. The damper assembly of claim 10, further comprising:

a coupler coupled with said second fluid circuit valve adjustor, wherein said adjustor shaft is coupled with said coupler.

12. The damper assembly of claim 10, wherein said secondary first fluid circuit valve does not adjust said flow of said first fluid circuit flow path when said second fluid circuit valve adjustor is in a position other than said closed position.

13. The damper assembly of claim 10, wherein said second fluid circuit valve adjustor modifies said first fluid circuit flow path when said second fluid circuit valve adjustor is in a position other than said closed position.

14. The damper assembly of claim 10, wherein said secondary first fluid circuit valve will adjust said flow of said first fluid circuit flow path when said second fluid circuit valve adjustor is in said closed position regardless of a setting of said first fluid circuit valve.

15. The damper assembly of claim 10, wherein said second fluid circuit valve adjustor is selected from a group consisting of: a manual adjustor and an electronic adjustor.

16. The damper assembly of claim 10, wherein said adjustor circuit comprises:

a spring located between said preload hat and said upper assembly; and at least one adjustable second fluid circuit preload spacer used to modify a preload spring force of said spring.

17. The damper assembly of claim 10, wherein said adjustor circuit comprises:

at least one adjustable second fluid circuit position spacer used to modify a location of said preload hat with respect to said upper assembly.

18. A valve assembly configured to control a first fluid circuit and a second fluid circuit, said valve assembly comprising:

a second fluid circuit valve adjustor configured to actuate an adjustor shaft; and an adjustor circuit coupled with said adjustor shaft, wherein an input to said second fluid circuit valve adjustor translates into a movement of said adjustor shaft, said adjustor circuit comprising:

a second fluid circuit valve;

a secondary first fluid circuit valve disposed along a first fluid circuit flow path of a first fluid circuit valve, said secondary first fluid circuit valve configured to adjust a flow through said first fluid circuit flow path when said second fluid circuit valve adjustor is in a closed position;

a preload hat coupled with said adjustor shaft, a first fluid circuit valve opening formed through said preload hat; and a first fluid circuit outlet formed in a base valve assembly body, wherein said first fluid circuit outlet is encumbered by said preload hat when said adjustor is moved into a closed position and wherein said first fluid circuit outlet is unencumbered by said preload hat when said adjustor is moved out of a closed position.

19. The valve assembly of claim 18, wherein the preload hat is coupled with said adjuster shaft such that a rotational movement of said adjuster shaft modifies a preload provided by said preload hat.

20. The valve assembly of claim 18, wherein the preload hat is coupled with said adjuster shaft such that a rotational movement of said adjuster shaft modifies a pivot diameter on a shim stack.

21. A damper assembly having a valve assembly configured to control a first fluid circuit and a second fluid circuit, said damper assembly comprising:

a second fluid circuit valve adjustor configured to actuate an adjustor shaft; and an adjustor circuit coupled with said adjustor shaft, wherein an input to said second fluid circuit valve adjustor translates into a movement of said adjustor shaft, said adjustor circuit comprising:

a second fluid circuit valve;

a secondary first fluid circuit valve disposed along a first fluid circuit flow path of a first fluid circuit valve, said secondary first fluid circuit valve configured to adjust a flow through said first fluid circuit flow path when said second fluid circuit valve adjustor is in a closed position;

a preload hat coupled with said adjustor shaft, a first fluid circuit valve opening formed through said preload hat; and a first fluid circuit outlet formed in a base valve assembly body, wherein said first fluid circuit outlet is encumbered by said preload hat when said adjustor is moved into a closed position and wherein said first fluid circuit outlet is unencumbered by said preload hat when said adjustor is moved out of a closed position.

* * * * *